H. A. MAVOR.
CONTROL OF ELECTRIC MOTORS.
APPLICATION FILED SEPT. 4, 1909.
944,453.
Patented Dec. 28, 1909.
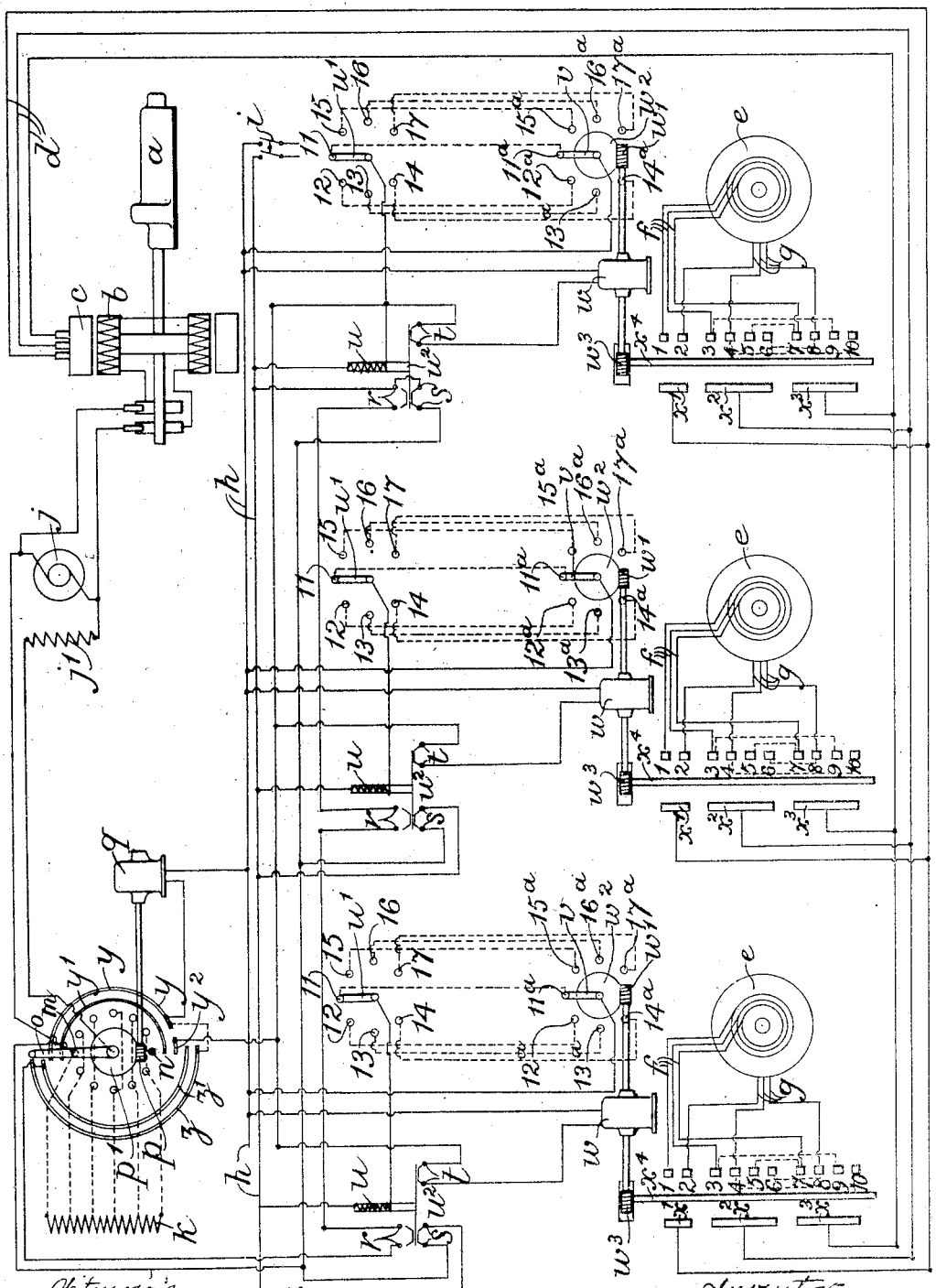

UNITED STATES PATENT OFFICE.

HENRY ALEXANDER MAVOR, OF MILE END, GLASGOW, SCOTLAND.

CONTROL OF ELECTRIC MOTORS.

944,453.

Specification of Letters Patent. Patented Dec. 28, 1909.

Application filed September 4, 1909. Serial No. 516,325.

*To all whom it may concern:*

Be it known that I, HENRY ALEXANDER MAVOR, a subject of the King of Great Britain and Ireland, residing at Mile End, in the city and county of Glasgow, Scotland, have invented Improvements Relating to the Control of Electric Motors, of which the following is a specification.

This invention relates to the control of electric motors and more especially to those of large power which require to be started, stopped and reversed, it may be while connected to the work which subjects them to full load, and it has for its object to provide simple and improved means wherein it is insured that prior to operating the controlling switches in any operation which involves interrupting the main circuit of the motor with a view to effecting a change of speed or other running condition, the current supplied to the motor is reduced in value or stopped by manipulation of the primary or generator element of the supply circuit and the reduction or stoppage so produced remains until the desired change has been made in the controlling arrangements in the main circuits of the motors and these circuits are again closed, after which the current is restored to the value required for dealing with the work.

The invention is particularly applicable for use in marine propulsion embodying self-contained generator and motor plant, the motor or motors being conveniently of the multiphase alternating current type capable of speed regulation in the manner described in the specification of Letters Patent No. 912,144 and the generator driven by a prime mover so that either current of a single periodicity is supplied or current of any of a number of different periodicities.

The invention, while capable of being variously carried into effect, may with advantage be embodied in a plant where the current is supplied by a turbo-alternator to a motor of the kind referred to in the said former specification No. 912144. According thereto, it is arranged to vary the excitation of the generator in a gradual manner by a controller, conveniently in the form of a rheostat, driven by an auxiliary motor from a suitable source and adapted, if desired, to completely interrupt the circuit of the excitation windings after the insertion of sufficient resistance therein. This will have the effect of reducing or interrupting the current supplied to the motor and will permit say the reversing switch thereof to be opened without harmful result such as would arise from interruption of the circuit while carrying large high voltage current. The operation of the said switch is performed by a second auxiliary motor the function of which is controlled by means interlocked with the controlling means of the motor employed for varying the generator excitation. For example, the two auxiliary motors may be electrically connected to a two-way switch with circuit breakers so arranged that when it is required to operate the reversing switch or switches controlling the main motor or motors, the exciting current of the main generator or generators is reduced or interrupted before the reversing switch contacts are moved into the open position and only when the contacts of this switch have been restored to the closed position by the action of the motor operating them, and not until then, can the excitation of the generator or generators be restored by means of the motor operated controller in the exciter field circuit.

The accompanying drawing diagrammatically illustrates an installation suitable for marine propulsion with the aid of three motors and a single electric generator.

As there shown, $a$ is a turbine, $b$ the field magnet of a three phase alternator driven by the turbine, $c$ the stator of the alternator and $d$ the circuit to which the motors $e$ are connected.

1 to 10 are a series of contacts, of which 1, 3, 5, 7 and 9 constitute a reversing switch controlling leads $f$ supplying current to the main inductor of the motor while contacts 2, 4, 6, 8 and 10 constitute a reversing switch controlling leads $g$ supplying current to the inductor of what is called the spinner or regulating motor which, when stationary, permits the motor to run at its characteristic speed, hereinafter termed half speed, and when used to influence the motor in either a positive or negative direction, increases or diminishes said characteristic speed, to produce what is hereinafter respectively termed full speed and slow speed.

$h$ is a local circuit supplied with current from any suitable source under the control of a switch $i$.

$j$ is a separate exciter for the field magnet $b$ of the alternator having its field winding $j^1$ connected to a resistance $k$ with which cooperate a series of connected contacts, one of which is herein specifically referred to as the contact $m$, and a disconnected contact $n$, adapted to be successively engaged by an arm $o$, operated, as by a worm $p$ and worm wheel $p^1$ from an electric motor $q$. In connection with each motor $e$ is a circuit breaker comprising a pair of contacts $r$, a pair of contacts $s$ and a pair of contacts $t$, $u^2$ being a bridging member controlled by an electromagnet $u$ for bridging either the contacts $r$ alone, or the contacts $s$ and $t$ conjointly. The circuit of each electro-magnet $u$ is adapted to be completed across the leads $h$ and interrupted by means of a manually operated switch arm $u^1$ and a series of contacts 11, 12, 13, 14, 15, 16 and 17 that are respectively connected to corresponding contacts $11^a$ to $17^a$ of a companion switch the arm $v$ of which is arranged to be moved by a motor $w$, as through a worm $w^1$ and worm wheel $w^2$, as hereinafter set forth, the said motor $w$ serving also to operate, as through a worm $w^3$, the movable contacts pertaining to the contacts 1 to 10 of the controlling switches of the corresponding motor $e$.

The movable contacts referred to, which may be of any suitable kind, are only conventionally represented by bars $x^1$, $x^2$, $x^3$ movable with a shaft $x^4$. The circuit of the motor $q$ is adapted to be completed by brushes, not shown, carried in an insulated manner from the switch arm $o$ of the exciter rheostat, firstly through segmental contacts $y$, $y^1$ and circuit breaker contacts $s$, and secondly through segmental contacts $z$ $z^1$ and the circuit breaker contacts $r$, which latter contacts pertaining to all three circuit breakers are arranged in series relationship, necessitating the circuit breakers being in similar positions before the circuit can be completed. The circuits of the motors $w$ are completed through a segmental contact $y^2$, the segmental contact $y^1$ and the circuit breaker contacts $t$ and $s$ only when the circuit of the motor $q$ is interrupted. The action is as follows:—Supposing all the elements to be at rest and the order "stand by engines" be given, then the duty will be to make certain that the manual switch arms $u^1$ are in engagement with the contacts 11 as shown, corresponding to "off" position, to close the switch $i$ of the local circuit $h$ and to start the turbine $a$.

The closing of the switch $i$ will cause current to flow from one lead of the circuit $h$ in parallel through the switch arms $v$ contacts $11^a$ and 11, switch arms $u^1$ and electromagnets $u$ to the other lead of the circuit $h$. The magnets $u$ being thereby energized cause the bridging members $u^2$ of the circuit breakers to move and bridge the contacts $r$, whereupon the arrangement is in condition to respond to the order next given. Thus, assuming it is desired to effect propulsion at slow speed ahead, the manual switch arms $u^1$ would in this particular case be moved into engagement with contacts 12, thereby interrupting the circuit of the electromagnets $u$ and causing the bridging members $u^2$ of the circuit breakers to move and bridge the contacts $s$ and $t$. The result of this will be to complete the circuit of the motor $q$ from one lead of the circuit $h$ by way of the segmental contact $y$, the corresponding insulated brush upon the switch arm $o$, segmental contact $y^1$ and circuit breaker contacts $s$ to the other lead of the circuit $h$. The motor $q$ thereupon starts and moves the arm $o$ in a clockwise direction from contact $m$ over the remainder of the series to successively include sections of the resistance $k$ in series with the field winding $j^1$ of the exciter $j$ until the contact $n$ is reached when the exciter field circuit is interrupted. As soon as the arm $o$ engages the contact $n$ it leaves the segmental contact $y$ and the insulated brush pertaining thereto engages the contact $y^2$, thereby interrupting the circuit of the motor $q$. At the same time as the circuits of the exciter field $j^1$ and motor $q$ are interrupted, the circuits of motors $w$ are completed in parallel from one lead of the circuit $h$ by way of the circuit breaker contacts $t$, contact $y^2$, insulated brush on the switch arm $o$, segmental contact $y^1$ and circuit breaker contacts $s$ to the other lead of the circuit $h$. The motors $w$ then commence to rotate the switch arms $v$ in a counter clockwise direction until each contact $12^a$ is engaged whereupon the circuits of the electromagnets $u$ are completed and the circuit breakers restored to positions which interrupt the circuits of the motors $w$ and bridge the contacts $r$ in series. The other insulated brush on the switch arm $o$ being in engagement with the segmental contacts $z$ and $z^1$, the circuit of the motor $q$ will be completed from one lead of the circuit $h$ by way of the said contacts $z$ $z^1$, their co-acting insulated brush, and the contacts $r$ of all the circuit breakers to the other lead of the circuit $h$, thereby causing the arm $o$ to continue to move in a clockwise direction and cut out the resistance $k$ in the exciter field circuit until the contact $m$ is reached as shown when the circuit of the motor $q$ is again interrupted and the parts left in readiness to respond to the next order given.

During the movement of each switch arm $v$ from contact $11^a$ to contact $12^a$ as explained above, the motors $w$ have operated the circuit controlling switches of the motors $e$ so that contacts 1, 2 may be assumed to be bridged by bar $x^1$, contacts 3 and 6 by bar $x^2$ and contacts 7 and 10 by bar $x^3$, the spinner being in consequence negatively rotated. It will be understood that a similar sequence of steps takes place, whichever contact 11 to 17, the switch arm $u^1$ is move into engagement with, the only variation consisting in the extent of operation of the circuit controlling switches of the motors e which may be briefly alluded to. Thus contact 13 is intended to produce "half speed ahead" in which case bar $x^1$ will be assumed to engage contact 1 alone, bar $x^2$ contact 3 alone and bar $x^3$ the contact 7 alone, the spinner thereby being inactive. Contact 14 is intended to produce "full speed ahead", in which case bar $x^1$ will be assumed to bridge contacts 1 and 2, bars $x^2$ contacts 3 and 4 and bar $x^3$ contacts 7 and 8, the spinner thereby being positively rotated. Contact 15 is intended to produce "slow speed astern", in which case bar $x^1$ will be assumed to bridge contacts 1 and 2, bar $x^2$ contacts 4 and 5 and bar $x^3$ contacts 8 and 9, the circuit relationships being relatively the same as for "slow speed ahead" but reversed. Contact 16 is intended to produce "half speed astern" in which case bar $x^1$ will be assumed to engage contact 1 alone, bar $x^2$ contact 5 alone and bar $x^3$ contact 9 alone the spinner being again idle. Finally contact 17 is intended to produce "full astern" in which case it will be assumed that bar $x^1$ bridges contacts 1 and 2, bar $x^2$ contacts 5 and 6 and bar $x^3$ contacts 9 and 10.

What I claim is:—

1. Electric motor controlling means, comprising, in combination with a generator and a motor, an exciter, a controller for the exciter, a controller for the motor, auxiliary motors for driving such controllers and interlocking means to insure that one such auxiliary motor can alone be in operation at a time.

2. Electric motor controlling means, comprising, in combination with a generator and a motor, an exciter for the generator, a field winding for the exciter, a resistance in connection with the field winding and means for altering the active length of such resistance, a controller for the motor, an auxiliary motor for operating the resistance varying means, an auxiliary motor operating the motor controller and a switch arrangement adapted to set the motor of the exciter field resistance varying means in action to alter the generator excitation before the auxiliary motor of the motor controller is set in action.

3. Electric motor controlling means, comprising, in combination with a generator and a motor, an exciter for the generator, a field winding for the exciter, a resistance in connection with the field winding and means for altering the active length of such resistance, an auxiliary motor for operating the resistance varying means, an auxiliary motor for operating the motor controller, and a switch and circuit breaker arrangement electrically connecting the auxiliary motors so that the auxiliary motor of the resistance varying means is set in action to produce generator variation before the other auxiliary motor can be set in action to move the motor controller to open position and the first named auxiliary motor prevented from being re-started to restore the original generator conditions before the auxiliary motor of the motor controller has moved the motor controller to closed position and stopped.

4. Electric motor controlling means, comprising, in combination with a generator and a motor, an exciter for the generator, a motor operated controller for the exciter, a motor operated controller for the motor, a source of electric energy common to both controllers, a circuit breaker for alternatively completing the electric circuit of both controller motors and a switch operated in one direction manually and in the same direction by the motor of the motor controller adapted to actuate the circuit breaker and bring the controller motors into use alternately.

5. Electric motor controlling means, comprising, in combination with a generator and a motor, an exciter for the generator, a motor operated controller for the exciter, a motor operated controller for the motor, a source of electric energy common to the motors of both controllers, a circuit breaker for alternatively completing the electric circuit of both motor controllers, an electromagnetic winding for operating the circuit breaker, a manually operated switch adapted to complete the circuit of the said winding and operate the circuit breaker to close at one point the circuit of the exciter controller motor or to interrupt the circuit of the said winding and operate the circuit breaker to open the previously closed point and to close the circuits of both controller motors at other points, and a switch operated by the motor of the motor controller for again completing the circuit of the circuit breaker winding.

6. Electric motor controlling means, comprising, in combination with a generator and a main motor, an exciter for the generator, a field winding for such exciter, a resistance in connection with the field winding, a switch for fractionally cutting such resistance into and out of circuit with the exciter field winding, a motor for operating such switch, a switch for the main motor, an auxiliary motor operating such switch, means for starting the motor of the exciter switch while there is no resistance in circuit with the exciter field winding to gradually cut such resistance into circuit, means for arresting the exciter switch motor when all the resistance is cut in, means for then automatically starting the auxiliary motor of the main motor switch and means operated by the said auxiliary motor for causing it to stop automatically and re-start the motor of the exciter switch to cut out resistance in the exciter field winding.

7. Electric motor controlling means, comprising, in combination with a generator and a motor, an exciter for the generator, a motor operated controller for the exciter, a motor operated controller for the motor and means adapted to first set the exciter controller in operation to decrease the excitation of the generator, then to arrest such controller and set the controller of the motor in operation to alter its running condition and finally to arrest the controller of the motor and restart the exciter controller to restore the normal excitation of the generator.

8. Electric motor controlling means, comprising, in combination with a generator and a plurality of motors, an exciter for the generator, a motor operated controller for the exciter, a motor operated controller for each motor, means adapted to first set the exciter controller in operation to decrease the excitation of the generator, then to arrest such controller and set the controllers of the motors in operation to alter their running condition and finally to arrest the controllers of the motors and re-start the exciter controller to restore the normal excitation of the generator and means for insuring that the controllers of all the motors shall be in similar positions before such re-starting of the exciter controller.

9. Electric motor controlling means, comprising, in combination with a generator and a plurality of motors, an exciter for the generator, a motor operated controller for the exciter, a motor operated controller for each motor, a source of electric energy common to all the controllers and circuit breakers individually governing the motor controllers and collectively governing the exciter controller.

Signed at Glasgow this twenty first day of August 1909.

HENRY ALEXANDER MAVOR.

Witnesses:
P. PENMAN,
J. B. MAVOR.